United States Patent
Kivenson

[15] 3,683,691
[45] Aug. 15, 1972

[54] VORTEX REACTION TYPE FLUID FLOW INDICATOR

[72] Inventor: Gilbert Kivenson, Pasadena, Calif.
[73] Assignee: Westinghouse Electric Corporation, Pittsburgh, Pa.
[22] Filed: Sept. 18, 1970
[21] Appl. No.: 73,543

[52] U.S. Cl. ............................73/194 B, 340/239 R
[51] Int. Cl. ..........................................G01f 1/00
[58] Field of Search .........73/194 B, 70.2, 71.2, 71.4; 335/205; 200/81.9 M; 340/239

[56] References Cited

UNITED STATES PATENTS

| | | | |
|---|---|---|---|
| 1,935,445 | 11/1933 | Heinz | 73/194 B |
| 2,600,011 | 6/1952 | MacDonald et al. | 200/81.9 M |
| 2,600,309 | 6/1952 | MacDonald et al. | 200/81.9 M |
| 2,813,424 | 11/1957 | Liepmann et al. | 73/194 B X |
| 3,116,639 | 1/1964 | Bird | 73/194 B |
| 3,175,399 | 3/1965 | Medlar | 73/194 B |
| 3,273,389 | 9/1966 | Waugh | 73/194 B |
| 3,419,877 | 12/1968 | Roth | 335/205 X |

FOREIGN PATENTS OR APPLICATIONS

| | | | |
|---|---|---|---|
| 992,852 | 5/1965 | Great Britain | 335/205 |

Primary Examiner—Charles A. Ruehl
Attorney—F. H. Henson, R. G. Brodahl and C. J. Paznokas

[57] ABSTRACT

A fluid flow indicator having (a) a vortex reaction responsive oscillatable member disposed within a conduit, for transmitting energy non-mechanically through the conduit wall to a responder located outside the conduit to provide a response that is a measure of the fluid flow. The non-mechanical transmission through the conduit wall may be by way of electromagnetic radiation caused for example: by a moving magnetic element producing a relatively moving magnetic field; or by radioactivity. The responder responds to electromagnetic radiation in the specific form employed, field disturbance or change by a moving magnetic member, or radioactivity, as the case may be.

5 Claims, 5 Drawing Figures

Patented Aug. 15, 1972
3,683,691
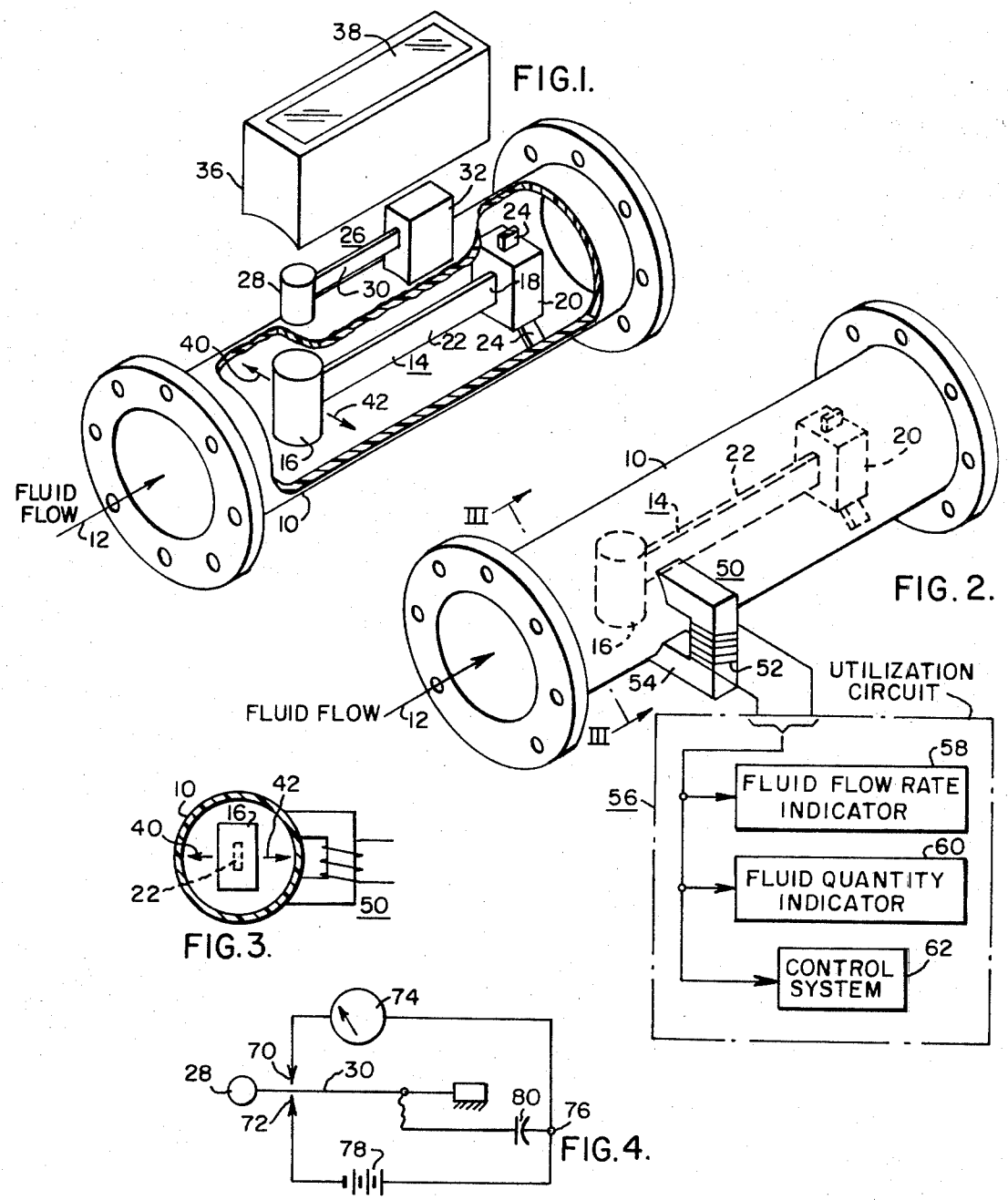
INVENTOR
Gilbert Kivenson
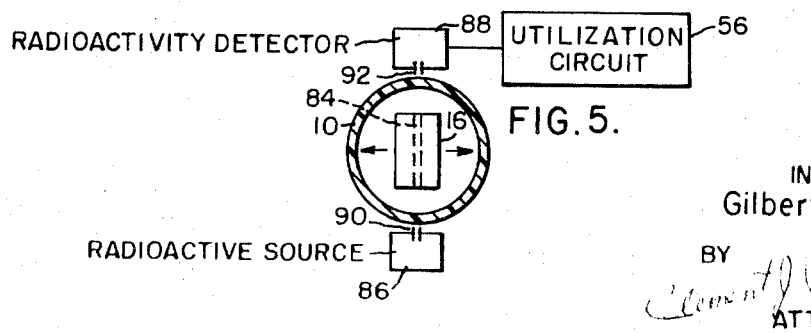
ATTORNEY

VORTEX REACTION TYPE FLUID FLOW INDICATOR

BACKGROUND OF THE INVENTION

It is often necessary for chemical and power plant operators to have quantitative and non-quantitative indications of fluid flow in a piping system. This information might be required, for example, to check on the proper functioning of various types of machinery, to measure fluid quantity, or to predict the onset of dangerous operating conditions.

One class of device used at present consists of a pivoted plate mounted in a horizontal section of pipe. The plate can be observed through side windows. In the "noflow" condition, the plate hangs vertically. When flow starts, the plate swings out on its pivot to an angular position which is roughly proportional to the flow of velocity. The operator judges the presence of flow partly by the deviation of the plate from vertical and by minute motions it makes in response to velocity variations.

Another widely used flow indicator contains a rubber ball loosely trapped between two screens. The apparatus is arranged so that the flow must pass through the screens. The ball is first pushed towards the downstream screen; it rebounds and is again caught in the flow. Rotary as well as translational motion is induced in the ball. The movement is observed through windows in the side of the apparatus.

A major difficulty with the devices described above lies in the use of a window. The latter prevents application of the instrument to highly corrosive liquids which would destroy the packing materials used as seals or would etch the glass itself. In nuclear power plants, flow indicators or this type would not be desirable because of low reliability at high pressure and temperature. Opaque liquids and slurries cannot be handled by these devices since observation of the moving element is difficult.

It is known to transmit information from inside a conduit to the outside by means of mechanical coupling between a movable inside member and an outside indicator. However, this presents a problem with seals which need to resist fluid pressure, and need resist attack in the case of corrosive fluids.

It is also known to transmit such information by means of magnetic coupling between an inside magnetic member and an outside indicating device. However, the devices of the prior art employing such magnetic coupling have been of limited applicability and value.

It is known in the art of vortex reaction flow meters to mechanically couple a vortex reaction element located inside a conduit to a magnetic member outside the conduit which in turn is magnetically coupled to a coil in such a manner as to change flux linkages with the coil in response to oscillation of the vortex reaction element, thereby to induce voltages in the coil. This of course is subject to all the disadvantages of transmitting mechanical coupling through the wall of the conduit.

While the desirability of indicating conditions in fluid lines by means of magnetic coupling between inner and outer members has been known for many years, to the best of my knowledge, this principle has not been applied to vortex reaction flow meters prior to my invention. A likely reason for this is that specific structures used in prior fluid devices employing magnetic coupling between inner and outer members for external indication of internal conditions are unsuited and not suggestive for use in connection with vortex reaction type fluid flow meters.

SUMMARY OF THE INVENTION

The present invention overcomes above discussed disadvantages by a unique flow indicating device having a vortex responsive oscillatable member inside a fluid conduit for transmitting energy non-mechanically through the conduit wall to a responder that responds to such energy transmission and thereby provide an indication of fluid flow. Such non-mechanical transmission through the conduit wall may be transmission of energy by electromagnetic radiation, for example, by radioactivity, or by a moving magnet or by X-rays, or by light. The vortex driven transmission member may for example be a radioactive source itself, or it may be a movable shutter interposed between a radioactive source and an external responder sensitive to electromagnetic radiation from a radioactive source.

In another example, the vortex driven energy transmission member is a magnet, and the external responder to the electromagnetic radiation of the moving magnet is a magneto-responsive device magnetically coupled through the conduit wall to the internal vortex driven magnet to provide a response indicative of fluid flow. The magneto-responsive device may be an oscillatable magnetic element, in which case the response of that element may be visible. The magneto-responsive device may be a pickup coil, in which case the response is an electric signal generated in the coil by the magnetic field variations produced by an oscillating internal magnetic member. The signal may, with or without processing be applied to indicating apparatus or to control apparatus. Examples of indicating apparatus are flow rate indicators and total fluid quantity indicators.

DESCRIPTION OF THE DRAWINGS 1 is a partially exploded and partially cut away view of one embodiment of the invention;

FIG. 2 is a view, partly mechanical and partly electric block diagram, illustrating another embodiment of the invention;

FIG. 3 is a section taken along the line III—III of FIG. 2;

FIG. 4 is a diagram illustrating use of magnetic responder as a single pole-double throw switch in an indicating circuit; and FIG. 5 is a sectional view illustrating the use of the vortex driven element as a shutter interposed between a radioactive source and a responder located outside the conduit and responsive to radioactivity.

DESCRIPTION OF THE PREFERRED EMBODIMENTS

Referring now to FIG. 1, there is shown a section of pipe or conduit 10 adapted for insertion in a fluid line wherein the fluid flow is in the direction of the arrow 12. Thus the left end of the conduit 10 is the upstream end, while the right end is the downstream end. Disposed within the pipe 10 is a vortex responsive oscillatory member 14 at least a portion of which is magnetic. The member 14 is provided with a head portion 16, a root portion 18 anchored in a block 20, and a flexible intermediate portion 22 between the head and root protions. The block 20 is fixed to the inner walls of conduit 10 by means of struts 24. The block 20 and struts 24 are made small to minimize flow impedance. By way of example, the magnetic portion of the member 14 is the head portion 16, and by way of further example the head 16 is a permanent magnet. The intermediate portion 22 of member 14 is shown as a flat spring which at rest lies in a plane parallel to the direction of fluid flow, whereby the head 16 may oscillate laterally or crosswise of the fluid flow direction in a constrained path due to the flat configuration of the spring. Thus in the example disclosed, the intermediate portion 22 is resilient as well as flexible.

Mounted on the exterior of the pipe 10 is a responder 26 for responding to the movements of the oscillatable member 14. The responder 26, similarly to the member 14, includes a resiliently mounted magnetic portion which is magnetically coupled to the magnetic portion of the member 14. More specifically, the responder 26 is provided with a magnetic head 28 fixed to one end of a flat spring 30 whose other end is secured in a block 32 that is attached to the exterior of the pipe 10. The orientation of responder 26 is spaced parallelism with the member 14 such that the heads 16 and 28 are substantially in line with each other and the flat dimensions of springs 22 and 26 are in substantially the same plane parallel to the main direction of fluid flow. Preferably the referred to plane is a vertical plane to avoid gravity sag of the springs.

For magnetic coupling to exist between the magnetic heads 16 and 28 so that head 28 will follow the lateral oscillations of head 16, at least one of the heads must be a magnet, and at least that portion of the conduit wall which is between the magnetic heads should be made of non-magnetic material such as plastic, brass, aluminum, Type 304 stainless steel, or other. Preferably, both heads 16 and 28 are permanent magnets. Head 28 is shown smaller than head 16 for better response. Spring 30 is also shown shorter than spring 22 to provide motion amplification.

Since it is necessary that a sufficient expanse of conduit wall between the member 14 and responder 26 be non-magnetic in order to effect operative magnetic coupling between member 14 and responder 26, it may be more convenient and in some cases preferable to make the entire conduit section 10 of non-magnetic material. The responder 26 is covered by a protective housing 36 mounted on the conduit 10 and provided with a transparent observation window 38 through which the responder 26 may be viewed. The housing 36 is shown "exploded" away from the conduit. Either the window or the conduit surface beneath the responder may be suitably marked with an index or scale to indicate or measure the deflection of the responder. The notations may for example be in terms of flow rate.

As will presently be explained, the head 16 is vortex driven in response to fluid flow through the pipe 10, and will oscillate at a frequency that is a function of the flow rate or velocity of the fluid. Due to the magnetic coupling between the heads 16 and 28, the head 28 will follow the movements of head 16 to provide a visual indication of flow rate.

It is well known that the vortices are formed when a fluid streams past an obstruction or through an orifice at a velocity lying within a range between certain lower and upper values that are both dependent on the dimensions of the obstruction or orifice and the kinematic viscosity of the fluid. A circular cylinder, for example, placed in a stream with its longitudinal axis at right angles to the direction of fluid flow, causes the fluid to divide in order to permit passage around the obstruction, and when the two flows recombine, vortices are formed on the down stream side of the cylinder at regular intervals and alternately, first at one side of the cylinder and then at the opposite side, which vortices detach themselves from the cylinder in two nearly parallel rows and are carried down stream at a relative velocity substantially proportional to the velocity of the fluid. Such a pattern of vortices is known as the "von Karman vortex street." It is also well known that the frequency at which these vortices are formed is substantially proportional to the relative velocity of the fluid. The effect of ultimate shedding of vortices is to impart a pulsating force on the cylinder alternately in opposite directions perpendicular to the fluid flow. The principle involved is known as "von Karman vortex shedding." If the cylinder is free to move laterally relative to the fluid flow direction, it will vibrate or oscillate in the direction of the force, that is, laterally or transversely of the fluid flow direction. The frequency of vibration is given approximately by:

$$f = k(u/d)$$

where
$f$ = frequency of vibration (cycles per second)
$u$ = fluid velocity (feet per second)
$d$ = cylinder diameter (feet)
$k$ = Strouhal's constant = 0.19

This relation applies in the range of Reynold's numbers between 500 and 100,000. In a practical application involving the flow of water in a 2 inch ID pipe and using a vibrating cylinder 0.5 inches in diameter, the range of detectable flows is 0.3 to 60 gallons per minute. The corresponding frequencies of oscillation of the cylinder would be 0.15 and 30 cycles per second.

In the illustrated example, the head 16 is a circular cylinder with its longitudinal axis perpendicular to the fluid flow direction, and in accordance with the foregoing explanation is vortex driven to oscillate in the direction of the arrows 40 and 42, that is transversely of the fluid flow direction, at a frequency substantially proportional to the fluid flow rate or velocity. Because of the magnetic coupling therebetween, the responder 26 will track or follow the oscillating member 14. More specifically the movement of the magnetic head 16 causes a change in the magnetic field pattern linking the heads 16 and 28 that forces head 28 to follow head 16. Whether the magnetic field change be considered as a change in position, or orientation, or pattern, or strength, or any combination of these, the result is that the responder 26 responds to such change or changes of the magnetic field and therefore responder 26 may be considered magneto-responsive. The reference to responder 26 as being magneto-responsive is applicable whether both heads 16 and 28 are magnets, or only one or the other is a magnet.

Although the above description of alternate vortex generation in two rows has been in connection with an obstruction in the form of a cylinder of circular cross-section, similar considerations apply in varying degrees to any obstacle or cylindrical form with its longitudinal axis at right angles to the direction of the fluid flow, even if non-circular in cross section, unless the cross-section is intentionally streamlined to avoid such vortex generation. In all cases the result of the alternate vortex generation in two rows is to generate alternating forces on the obstruction which under suitable conditions will set it in oscillation or vibration in a plane at right angles to the fluid flow direction.

Alternatively, the magneto-responsive responder may be an electrical circuit component for causing electrical effects occurring at the frequency of or a frequency proportional to that of the oscillatory member 14, for example a pickup coil or a magnetic switch such as a reed switch.

The embodiment of the invention shown in FIGS. 2 and 3, employs a magneto-responsive responder in the form of an electro-magnetic pickup 50. Except for the different responder, other parts are the same as in FIG. 1. Thus, the apparatus in FIG. 2 also includes a conduit section 10, a vortex driven oscillatable member 14 with a magnetic head 16 attached to one end of the spring 22, whose other end is fixed in a block 20 that is secured to the inside of the conduit 10 by means of struts 24.

The pickup 50 is diagrammatic and intended to be symbolic of any type of pickup that will generate electrical signals in response to magnetic field changes due to movement of the magnetic head 16. In the specific example shown, the pickup 50 includes a winding 52 on a magnetic U-shape core 54 so orientated that variation of the air gaps between head 16 and the legs of the core 54 due to movement of head 16 will produce varying flux linkages with the coil 52 thus inducing a voltage in the coil whose frequency is proportional to the fluid flow rate.

In order to provide operative magnetic coupling between head 16 and the magneto-responsive responder 50, at least one of the magnetic heads 16 and the magnetic core 54 should be a magnet. By way of example, the head 16 is shown as a permanent magnet while the core 54 is made of unmagnetized magnetic material such as soft steel or iron.

The electrical output from the pickup 50 is supplied to a utilization circuit 56, which may for example include any one or more of the following items: A flow rate indicator 58; a total quantity of flow indicator 60; and control apparatus 62 for controlling apparatus in the fluid system, for example flow control valves.

The flow rate indicator 58, may for example include an amplifier and an electric frequency meter calibrated in terms of flow rate. Suitable frequency meters for measuring the frequency of the voltage generated by pickup 50 are well known and need no further description. Likewise the total number of pulses or cycles of the output voltage from the pickup 50, starting from a given time, may be counted by any known means which may be calibrated to indicate quantity of fluid flow in the elapsed time. For example, the total flow quantity indicator 60 may include a rectifier to rectify the output from pickup 50, and pulse shapers and counters for suitably shaping the rectified output and counting the resulting pulses to provide an indication of total quantity of fluid flow. The output from pickup 50 may be applied to known circuits for converting the output to a DC voltage proportional to the frequency of the pickup coil output, and therefore to the fluid flow rate. Such voltage may be applied to a suitably calibrated DC meter to indicate flow rate or velocity. Such voltage may also be integrated by suitable known means to provide a measure of the total flow, since the total quantity of electricity flowing in a given time is proportional to the total flow of fluid in the same time. The output from pickup 50 may be supplied to the control system 62 as feedback to be compared to a reference for generation of an error signal in a servo system.

It should be understood that the pickup winding 52 will operate without the magnetic core 54, in which case, the magnetic member 16 must be a magnet.

In a variant of FIG. 3, the core 54 may be enlarged so that the pole ends straddle the pipe 10 and are diametrically across from each other and in line with the longitudinal axis of the head 16.

In another embodiment, the responder 26 of FIG. 1 may be the vibrator of a make and break switch in series between a battery and a circuit, which either counts the pulses formed by the vibrating switch or measures their frequency, or both, depending on the circuits employed. Counting circuits and frequency measuring circuits are well known and need no explanation. Along the same lines the magneto-responsive responder may be a strategically placed magnetic reed switch mounted on the outside of conduit 10 and within the field of influence of the magnet 16. Preferably, in the vibrating switch arrangements, the magnetic head 16 is a magnet.

An example wherein the responder 26 operates as a vibrating switch is shown in FIG. 4. In this arrangement the spring 30 is then employed as the blade of a single-pole double-throw switch with contacts 70 and 72. Contact 70 is connected through an ammeter 74 to a junction 76 which is connected through a battery 78 to the other contact 72. Junction 76 is also connected to one side of a capacitor 80, whose other side is connected to the vibrating switch blade 30. The circuit components are suitably selected so that the capacitor will become substantially fully changed and discharged even at the highest frequency of the blade 30. The average magnitude of the current flowing through ammeter 74 is substantially directly proportional to the quantity of electricity discharged therethrough from the capacitor per unit of time, and is substantially proportional to the frequency of the vibration of armature 17. The ammeter may be calibrated in fluid velocity.

In FIG. 5, the vortex driven head 16 is provided with a through slit 84 and operates as a shutter between a radioactive source 86 and a responder 88 that is responsive to radioactivity. The source 86 and the detector 88 may be provided with slits 90 and 92 that together with slit 84 are aligned when the head is in the center or neutral position. The source 88 may for example produce gamma rays, while the detector 88 responding to the gamma rays provides an electric signal having an alternating component (due to vibration of shutter) to a utilization circuit 56 for doing any one or more of the following: indicating total quantity of flow rate; and controlling some variable in the system. The responder 88 may include an ionization chamber, or a photo responsive arrangement employing a scintillator-photo multiplier combination. Instead of a radioactive source, a source of X-rays could be employed.

As an alternative, instead of radioactivity or a moving magnet, other forms of electromagnetic radiation may be employed, for example light using the shutter arrangement of FIG. 5, but with a light responsive responder.

It should be understood that in all embodiments of the invention the conduit wall, or at least the area of the wall in the path of the involved energy transmission, must be made of material that is sufficiently permeable to the specific energy transmission form employed to effect the desired transmission.

In the case of the relatively moving magnet, the conduit wall should be sufficiently magnetically permeable to effect the desired transmission. In the case of radioactive energy, the wall should be permeable to such energy transmission. Note that in the radioactive case, the vortex driven head 16 is desireably made of non-pervious material so that only the slit will pass the electromagnetic radiation from the radioactive source.

Although shown as a circular cylinder, head 16 may be any cylindrical or geometric shape which will be vortex driven to provide the desired movement of the head 16 and consequent response by the magnetoresponsive responders disclosed herein or their equivalents.

The invention disclosed herein provides improvements in fluid flow indicators by unique utilization of vortex driven elements magnetically coupled to outside responders without mechanical intervention through the conduit walls.

It should be understood that the herein described arrangements are simply illustrative of the principles of the invention, and other embodiments and applications are within the spirit and scope of the invention.

I claim as my invention:

1. Apparatus responsive to fluid flow comprising:
A. wall means defining a fluid conduit,
B. vortex-responsive oscillatory means disposed within said conduit in the path of fluid flow and adapted to oscillate transversely of the direction of fluid flow in response to vortex action produced by fluid flow obstruction, the oscillation of said oscillatory means being at a frequency which is a function of the velocity of fluid flow, said oscillatory means comprising a first magnetic head portion for transmitting magnetic field oscillations through the conduit wall, a root portion, and an intermediate portion connecting the head portion to the root portion, said root portion being anchored within said conduit, and said intermediate portion being flexible whereby said head portion in response to vortex reaction will oscillate laterally relative to the main direction of fluid flow; and
C. response means disposed externally of said conduit and responsive to said magnetic field oscillations for providing a response which varies as a function of a measure of the oscillations of said first magnetic head portion, said response means comprising a second magnetic head portion magnetically coupled to the first magnetic head portion, a fixed second root portion and a flexible intermediate portion connecting the second magnetic head and root portions, at least one of said head portions comprising a magnet, said oscillatory means and said response means being disposed in laterally spaced parallel relation, whereby oscillation of the first head portion induces oscillation of the second head portion due to said magnetic coupling.

2. The combination as in claim 1 wherein the first intermediate portion is a flat spring whose plane is parallel to the main direction of the fluid flow.

3. The combination as in claim 1 wherein said head portion generates vortices and is upstream from said root portion.

4. The combination as in claim 1 wherein said magnet is a permanent magnet.

5. The combination as in claim 4 wherein said head portion generates vortices and is upstream from said root portion.

* * * * *